United States Patent
Fox

(10) Patent No.: US 9,739,098 B2
(45) Date of Patent: Aug. 22, 2017

(54) ASSEMBLED DRILLING RIG MOVING UNIT

(71) Applicant: Nabors Industries Ltd., Houston, TX (US)

(72) Inventor: Richmond Todd Fox, Cypress, TX (US)

(73) Assignee: Canrig Drilling Technology Ltd., Houston, TX (US)

(*) Notice: Subject to any disclaimer, the term of this patent is extended or adjusted under 35 U.S.C. 154(b) by 408 days.

(21) Appl. No.: 14/288,918

(22) Filed: May 28, 2014

(65) Prior Publication Data

US 2015/0343935 A1 Dec. 3, 2015

(51) Int. Cl.
*B65G 67/04* (2006.01)
*E21B 15/00* (2006.01)
*B65G 67/24* (2006.01)

(52) U.S. Cl.
CPC ............ *E21B 15/003* (2013.01); *B65G 67/04* (2013.01); *B65G 67/24* (2013.01)

(58) Field of Classification Search
CPC .................................................. E21B 15/003
USPC .......................... 414/334, 391, 399, 332, 458
See application file for complete search history.

(56) References Cited

U.S. PATENT DOCUMENTS

| | | | | |
|---|---|---|---|---|
| 4,744,710 A * | 5/1988 | Reed | ....................... | E21B 19/14 175/52 |
| 7,331,747 B2 * | 2/2008 | Gardner | ............... | B65G 63/065 414/392 |
| 7,413,393 B1 * | 8/2008 | Barnes | ...................... | B60P 3/40 280/404 |
| 2012/0047820 A1 * | 3/2012 | Donnally | ................ | E21B 15/00 52/123.1 |
| 2012/0138327 A1 * | 6/2012 | Sorokan | .................... | E21B 7/02 173/189 |
| 2012/0167485 A1 * | 7/2012 | Trevithick | .............. | E21B 15/00 52/112 |
| 2013/0156538 A1 * | 6/2013 | Smith | .................... | B62D 57/02 414/800 |
| 2013/0269268 A1 * | 10/2013 | Thiessen | ................. | E21B 15/00 52/118 |
| 2014/0054097 A1 * | 2/2014 | Bryant | .................. | E21F 13/006 180/8.1 |

* cited by examiner

*Primary Examiner* — Jonathan Snelting
(74) *Attorney, Agent, or Firm* — Haynes and Boone, LLP

(57) ABSTRACT

A method that includes providing an assembled drilling rig on a first supportive surface at a first drill site, the assembled drilling rig having a walking system associated therewith, the walking system being configured to translate and rotate relative to the assembled drilling rig to displace the assembled drilling rig; actuating the walking system to lift the assembled drilling rig to a clearance height, relative to the first supportive surface; positioning a trailer under the assembled drilling rig; wherein the trailer includes a platform located above a plurality of wheels; supporting the assembled drilling rig on the trailer platform; and relocating the assembled drilling rig from the first drill site to a second drill site by rolling the wheels across the ground.

20 Claims, 13 Drawing Sheets

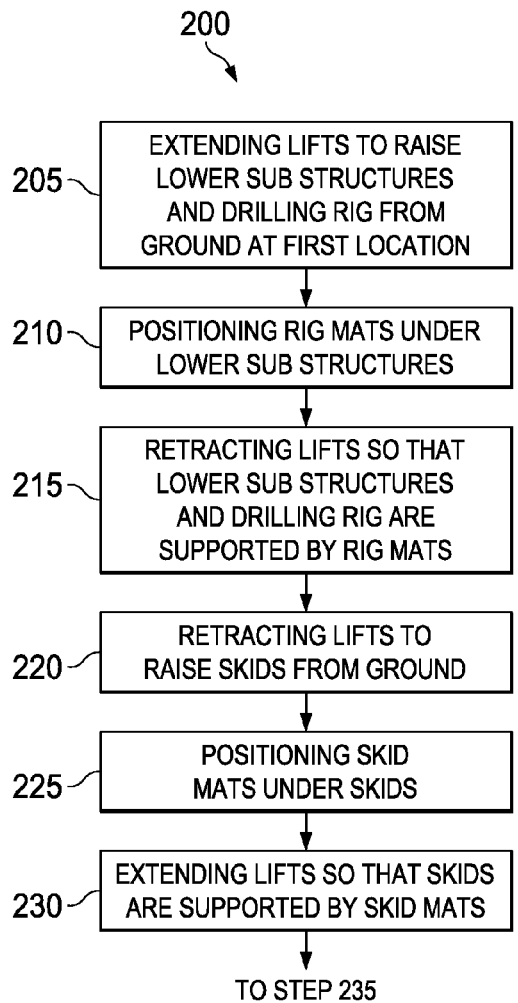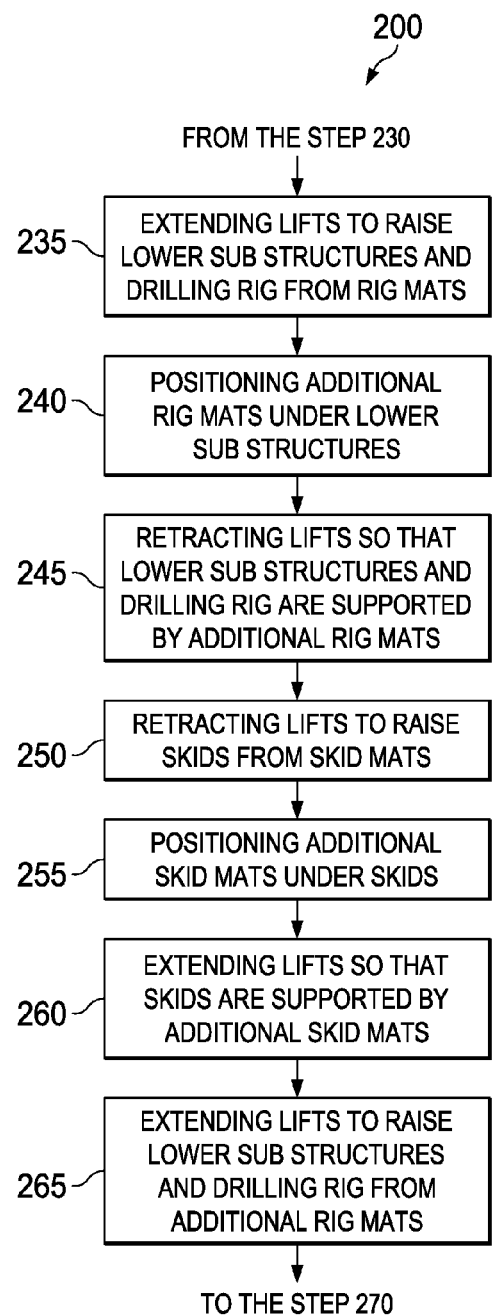
FIG. 2
FIG. 3

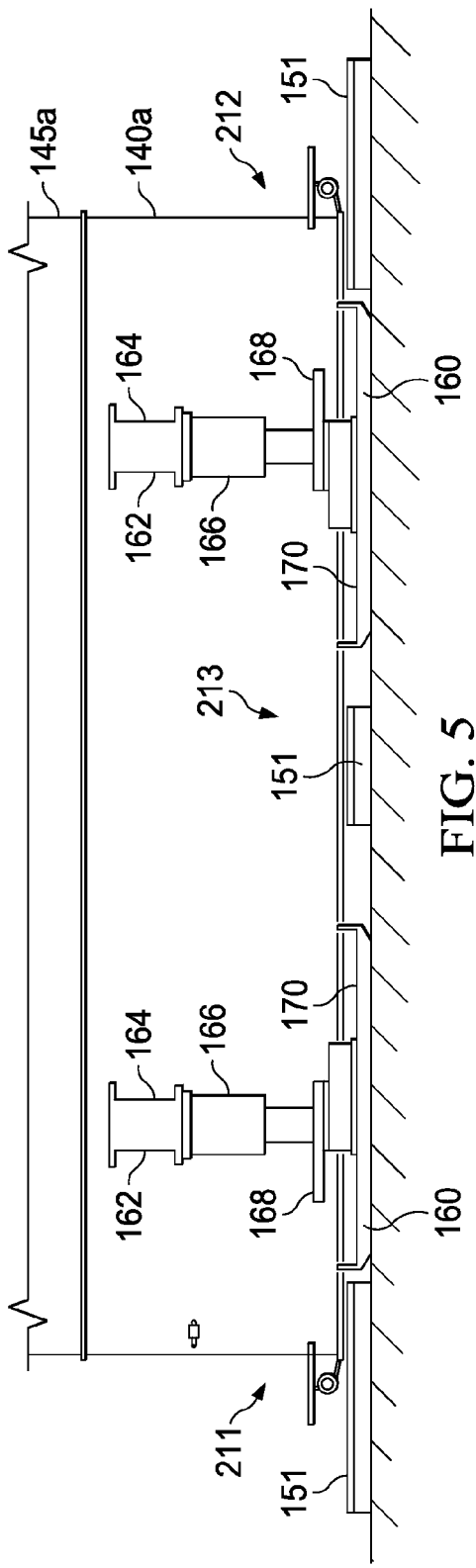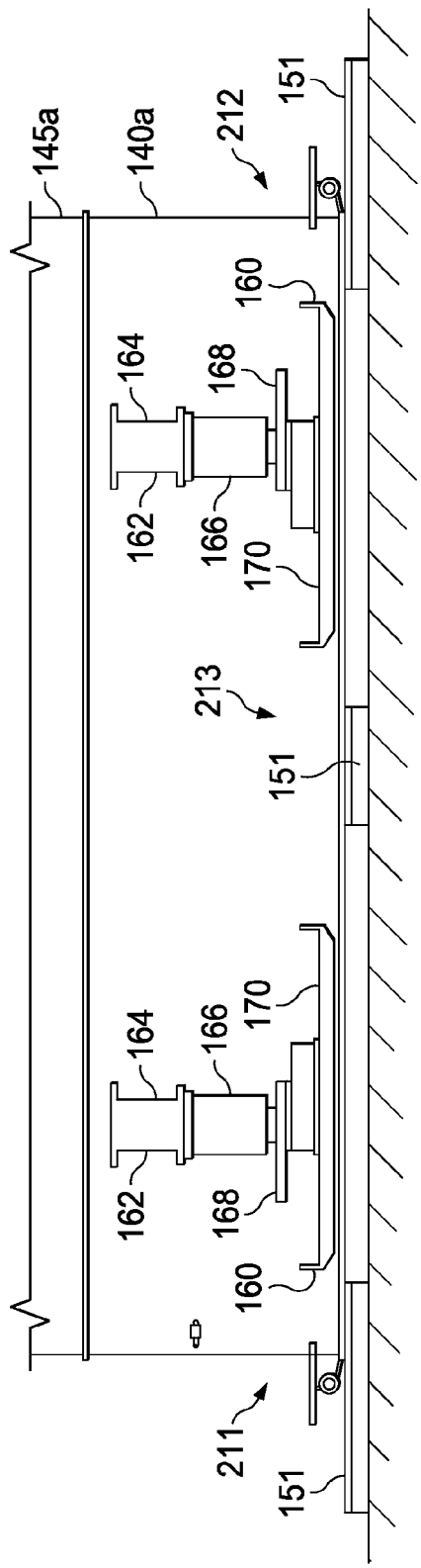

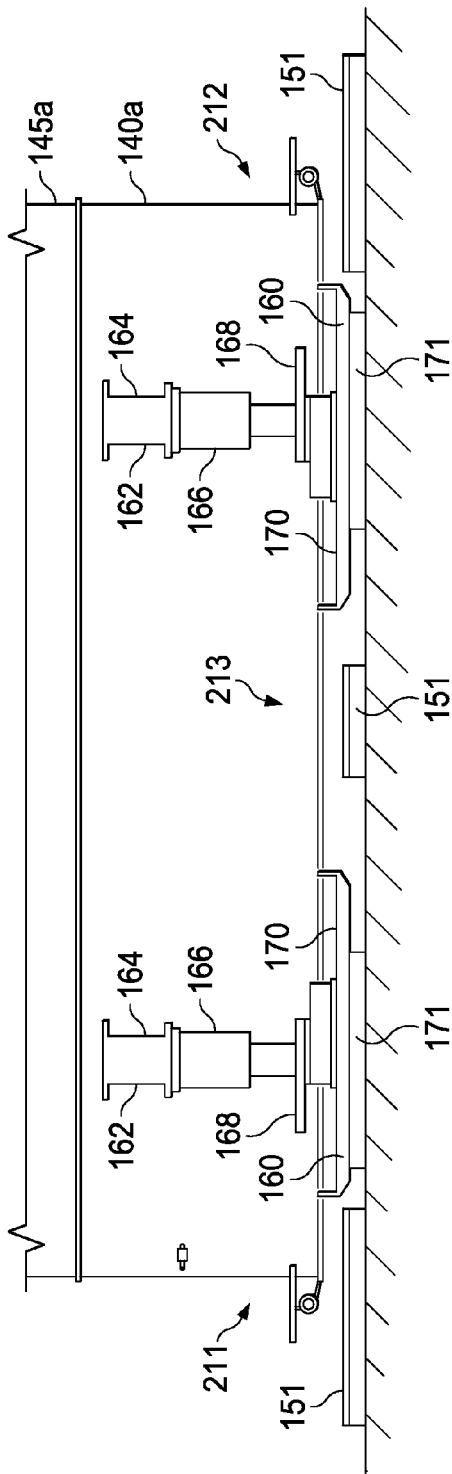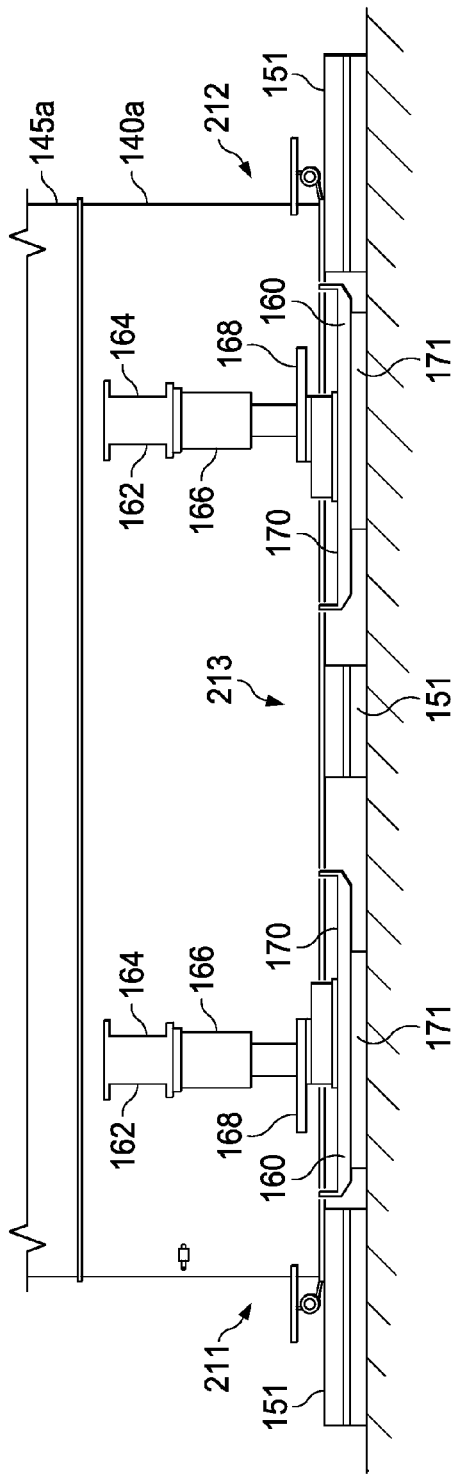

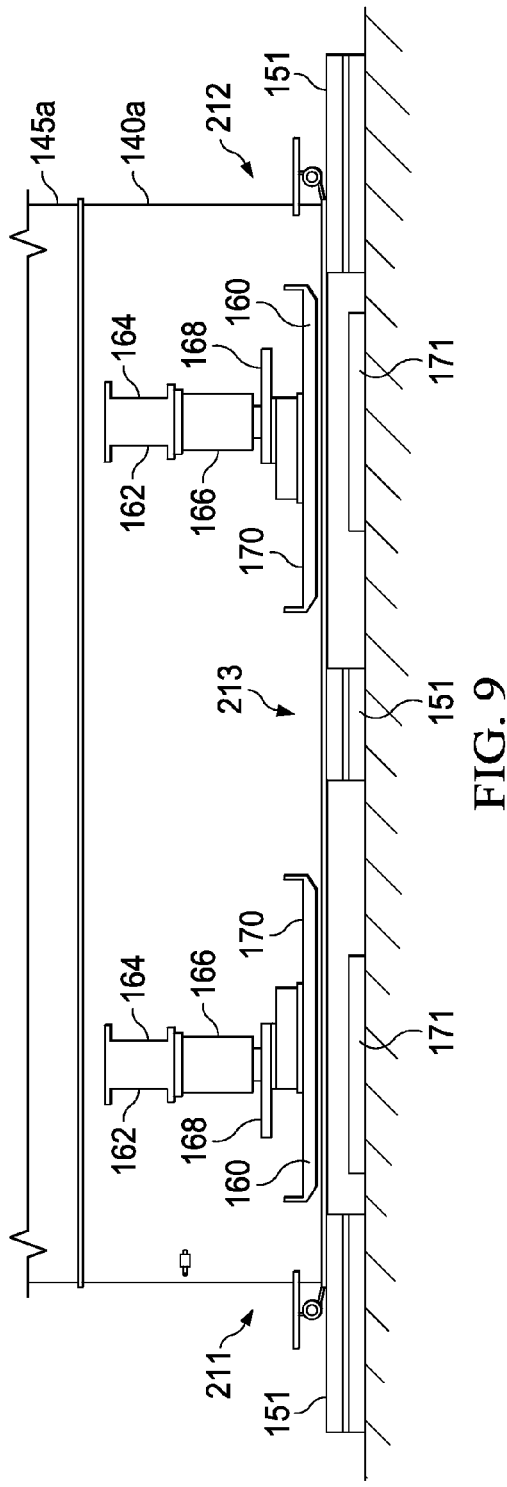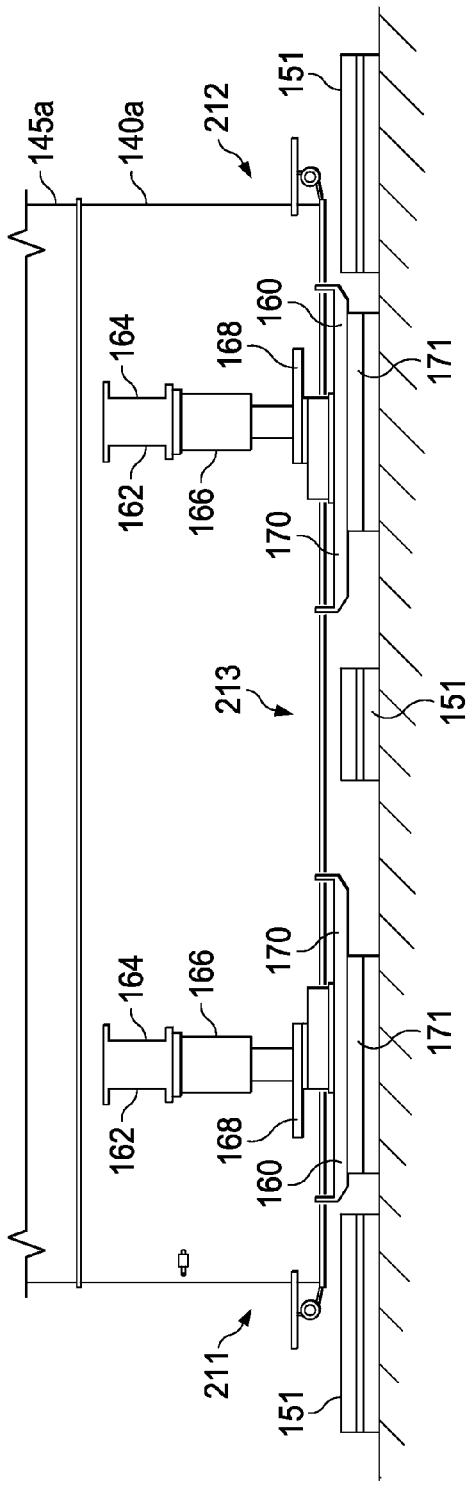

ASSEMBLED DRILLING RIG MOVING UNIT

BACKGROUND OF THE DISCLOSURE

The present disclosure relates in general to drilling rigs, and in particular to moving a drilling rig from one drill site to another drill site.

Once drilling operations associated with a drilling rig are completed at a drill site, the drilling rig is relocated to another drill site. Drill sites are often thousands of feet or miles apart. Often, an external jacking system must be transported to the drill site to lift the drilling rig onto a drilling rig transportation unit. Time delays, equipment rental costs, and personnel costs can be associated with the use and the rental of external jacking systems. Additionally, the drilling rig often must be disassembled prior to its relocation and then reassembled after arrival. Disassembly and subsequent reassembly can take days to complete and is associated with additional costs.

The present disclosure is directed to an assembled drilling rig moving unit and methods that overcome one or more of the shortcomings in the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a flow chart diagram of at least a portion of a method according to one or more aspects of the present disclosure.

FIG. 3 is a flow chart diagram of at least a portion of a method according to one or more aspects of the present disclosure.

FIG. 5 is side view of an apparatus according to one or more aspects of the present disclosure.

FIG. 6 is a side view of an apparatus according to one or more aspects of the present disclosure.

FIG. 7 is a side view of an apparatus according to one or more aspects of the present disclosure.

FIG. 8 is a side view of an apparatus according to one or more aspects of the present disclosure.

FIG. 9 is a side view of an apparatus according to one or more aspects of the present disclosure.

FIG. 10 is a side view of an apparatus according to one or more aspects of the present disclosure.

DETAILED DESCRIPTION

Figure 1:
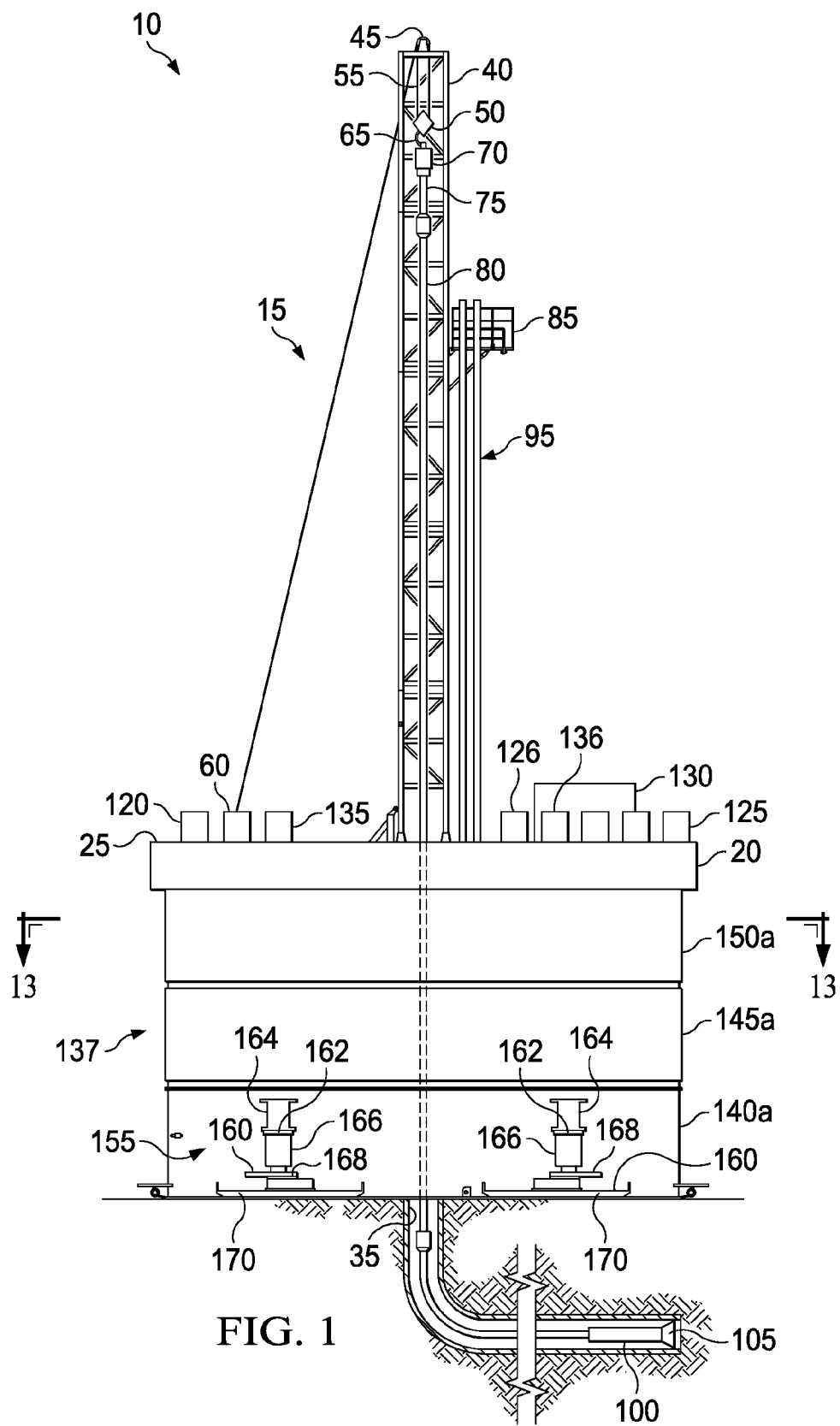
FIG. 1 is side view of an apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, illustrated is an elevational view of apparatus 10 during drilling operations. The apparatus 10 may form a part of or may be an entire land-based drilling rig 15. However, in several exemplary embodiments, instead of a land-based drilling rig, the apparatus 10 may be any type of drilling rig, such as a jack-up rig, a semi-submersible rig, a drill ship, a coil tubing rig, or a casing drilling rig, among others. In one embodiment, the drilling rig 15 includes a platform 20 with a platform floor or a rig floor 25. The platform 20 is positioned above a wellbore 35, which can be an existing wellbore or a planned wellbore.

The apparatus 10 also includes a mast 40 supporting lifting gear above the rig floor 25. The lifting gear includes a crown block 45 and a traveling block 50. The crown block 45 is coupled at or near the top of the mast 40, and the traveling block 50 hangs from the crown block 45 by a drilling line 55. One end of the drilling line 55 extends from the lifting gear to drawworks 60, which is configured to reel out and reel in the drilling line 55 to cause the traveling block 50 to be lowered and raised relative to the rig floor 25. The other end of the drilling line 55, known as a dead line anchor, is anchored to a fixed position, possibly near the drawworks 60 or elsewhere on the drilling rig 15. A hook 65 is attached to the bottom of the traveling block 50. A top drive 70 is suspended from the hook 65 or suspended directly from the traveling block 50. A quill 75 extends below the top drive 70, which is configured to attach to a drill string 80 suspended within the wellbore 35. Alternatively, the quill 75 may be attached to the drill string 80 directly. A racking board 85, or a monkey board, is attached to the mast 40 to accommodate sections of drill pipe 95. It should be understood that other conventional techniques for arranging a rig do not require a drilling line, and these are included in the scope of this disclosure.

The drill string 80 includes interconnected sections of drill pipe, a bottom hole assembly (BHA) 100, and a drill bit 105. The bottom hole assembly 100 may include stabilizers, drill collars, and/or measurement-while-drilling (MWD) or wireline conveyed instruments, among other components. The drill bit 105 is connected to the bottom of the BHA 100 or is otherwise attached to the drill string 80. One or more pumps (not shown) may deliver drilling fluid to the drill string 80 through a hose or other conduit (not shown), which may be fluidically and/or actually connected to the top drive 70. The drilling fluid also passes through a choke manifold 120, one or more shakers 125, a trip tank 126, and mud tanks (not shown), along with other equipment within a mud circulation system.

The apparatus 10 also includes an operator's cabin 130 attached to the platform 20. The apparatus 10 also includes a control system 135 configured to control or assist in the control of one or more components of the apparatus 10. For example, the control system 135 may be configured to transmit operational control signals to the drawworks 60, the top drive 70, and/or the BHA 100. The control system 135 may be a stand-alone component installed near the mast 40 and/or other components of the apparatus 10. The apparatus 10 also includes a blow out preventer (not shown) and an accumulator (not shown). The apparatus 10 also includes a hydraulic power unit (HPU) 136 that is configured to assist in the control of one or more components of the apparatus 10.

Figure 13:
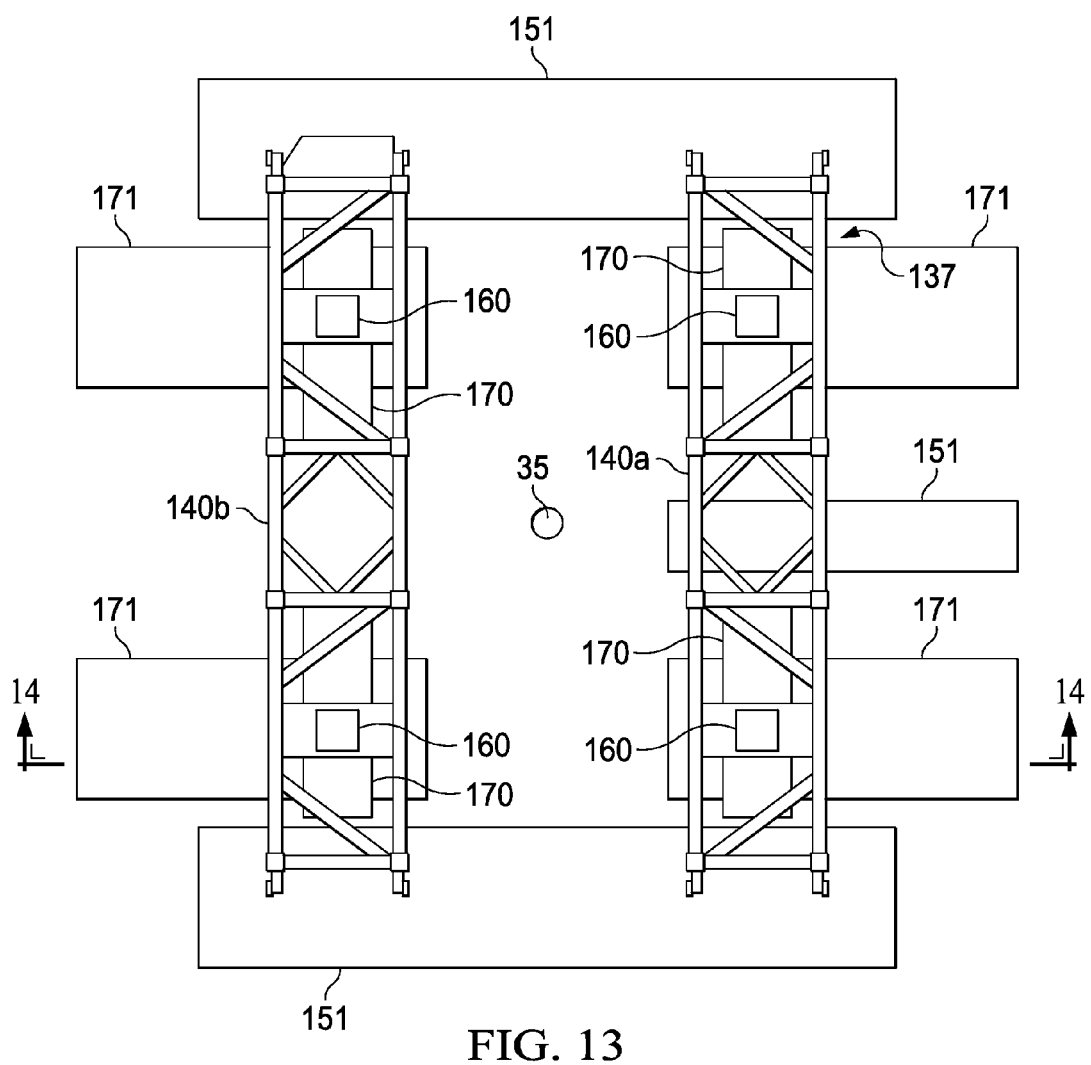
FIG. 13 is a plan view of an apparatus according to one or more aspects of the present disclosure.
Figure 14:
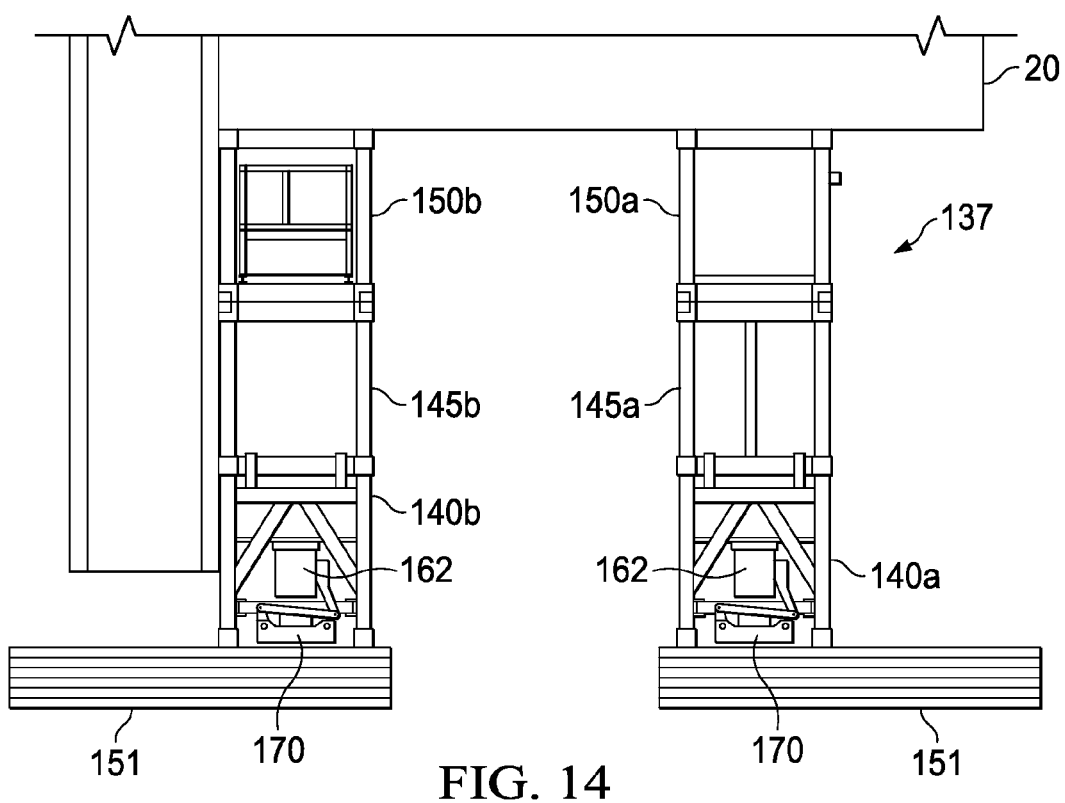
FIG. 14 is a side view of an apparatus according to one or more aspects of the present disclosure.

In one embodiment, the apparatus 10 also includes a support structure 137 having lower sub structures 140*a* and 140*b* (140*b* shown in FIG. 14), middle sub structures 145*a* and 145*b* (145*b* shown in FIG. 14), and upper sub structures 150*a* and 150*b* (150*b* shown in FIG. 14). In an exemplary embodiment, the lower sub structures 140*a* and 140*b*, the middle sub structures 145*a* and 145*b*, and the upper sub structures 150*a* and 150*b* are vertically stacked so that the upper sub structures 150*a* and 150*b* are coupled to the platform 20. The lower sub structures 140*a* and 140*b* are located on a supportive surface that supports the drilling rig 15, such as the ground. The middle sub structures 145*a* and 145*b* are located between the lower sub structures 140*a* and 140*b* and the upper sub structures 150*a* and 150*b*. In an exemplary embodiment, the lower sub structures 140*a* and 140*b* are adapted to rest on the ground, a plurality of rig mats 151, or cribbage, (shown in FIGS. 5-16), and trailers 152 (shown in FIGS. 16-18). However, the support structure 137 may include any variety of substructures. For example, the support structure 137 may include any one of a variety of sub structures such as, for example, a swing lift sub structure, a sling-shot style sub structure, or a skidding system sub structure wherein each of the swing lift sub structure, the slight-shot style sub structure, and the skidding system sub structure includes the lower sub structures 140*a* and 140*b*.

In an exemplary embodiment, the apparatus 10 also includes a walking system 155 attached to the support structure 137. In an exemplary embodiment, the walking system 155 includes feet 160 accommodated within each of the lower sub structures 140*a* and 140*b*. Each foot 160 includes a lift 162 that has a top portion 164 coupled to the lower sub structure 140*a* or 140*b* and a bottom portion 166. The lift 162 is located above a track 168 and a skid 170, and the bottom portion 166 of the lift 162 is coupled to the track 168 or the skid 170. The top portions 164 move relative to the bottom portions 166 and therefore, relative to the tracks 168 or the skids 170. In an exemplary embodiment, the lift 162 and the track 168 can also rotate relative to the skid 170. Therefore, the skid 170 can also rotate relative to the lift 162, the track 168, and the drilling rig 15. In an exemplary embodiment, the skids 170 contact the supportive surface, or the ground. The lifts 162 are capable of lifting the lower sub structures 140*a* and 140*b* relative to the supportive surface, such as the ground, so that the weight of the lower sub structures 140*a* and 140*b* are supported on the feet 160. Accordingly, the lower sub structures 140*a* and 140*b* and the top portions 164 can move vertically, relative to the tracks 168 and the skids 170. As the lifts 162 are attached to the lower sub structure 140*a* or 140*b*, the lifts 162 are also capable of lifting, or pulling, the tracks 168 and the skids 170 from the supportive surface, or the ground. The lifts 162 pull the tracks 168 and the skids 170 from the ground so that the skids 170 can move vertically, relative to the ground. In an exemplary embodiment, the lifts 162 are hydraulic cylinders. In an exemplary embodiment, the hydraulic cylinders have an 60 inch diameter.

In an exemplary embodiment, the walking system 155 is provided by Entro Industries, Inc. In an exemplary embodiment, the walking system 155 can be a pin-on configuration, which can be located outside of the support structure 137 and is detachable from the drilling rig 15. In an exemplary embodiment, the walking system 155 can be a pony-sub configuration or walkform configuration, which can be located within the support structure 137. In an exemplary embodiment, the walking system 155 includes a controller (not shown) that is in communication with each of the feet 160 to control the extension and retraction of the hydraulic cylinders or the lifts 162. In an exemplary embodiment, the feet 160 are configured to rest on the ground or a plurality of skid mats 171, or cribbage (shown in FIG. 7).

Figure 4:
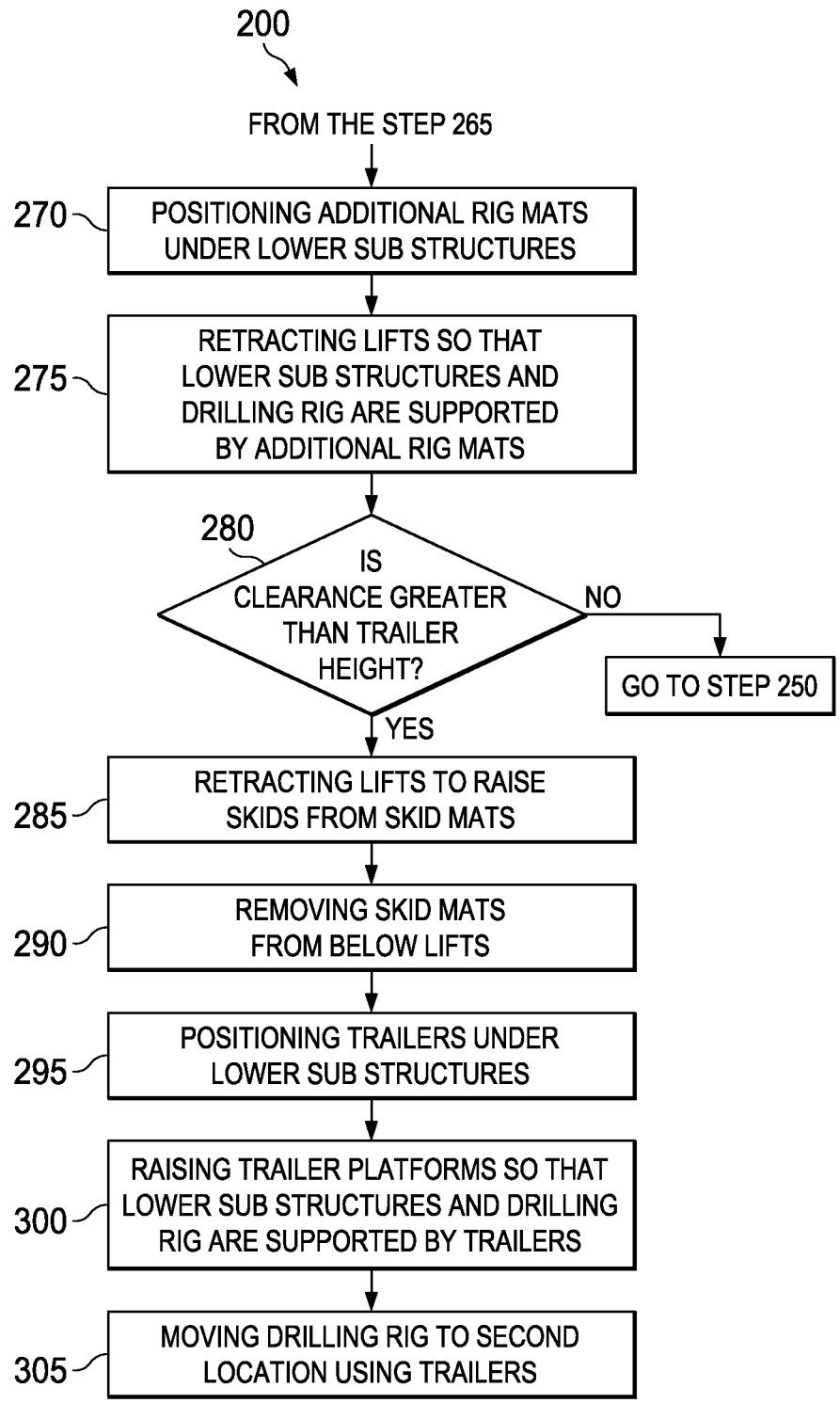
FIG. 4 is a flow chart diagram of at least a portion of a method according to one or more aspects of the present disclosure.

FIGS. 2, 3, and 4 describe an exemplary method of operating the apparatus 10 of FIG. 1. Here, the exemplary method is generally referred to by the reference numeral 200. In an exemplary embodiment, the execution of the method 200 results in the relocation, or movement, of the drilling rig 15 from one drill site to another drill site. While FIGS. 2, 3, and 4 set out the steps of the exemplary method, FIGS. 5-18 are relied upon and will be referenced to show the different processes and steps.

At step 205 in FIG. 2, the lifts 162 are extended to raise the lower sub structures 140*a* and 140*b* and the drilling rig 15 from the ground at a first location. This is shown in FIG. 5. In an exemplary embodiment, two of the feet 160 are located at least partially within the lower sub structure 140*a* and two of the feet 160 are located at least partially within the lower sub structure 140*b*. In an exemplary embodiment, the skids 170 are located on the ground. The lifts 162, or the hydraulic cylinders, are actuated to extend and to push the lower sub structures 140*a* and 140*b* and the drilling rig 15 off of the ground. In an exemplary embodiment and during the step 205, the drilling rig 15 is in an assembled configuration so that the mast 40 extends vertically from the platform 20. In an exemplary embodiment, the drilling rig 15 while in the assembled configuration includes the drilling line 55 extending from the crown block 45 to the traveling block 50. In an exemplary embodiment, the drilling rig 15, while in the assembled configuration, includes the plurality of shakers 125, the control system 137, and the choke manifold 120 being located on the rig floor 25. In an exemplary embodiment, the drilling rig 15, while in the assembled configuration, includes the racking board 85 being coupled to the mast and the plurality of pipe sections 95 being stored in the racking board 85. In an exemplary embodiment, the drilling rig 15, while in the assembled configuration, also includes the HPU 136 being connected to its supporting equipment. In an exemplary embodiment, the drilling rig 15, while in the assembled configuration, also includes the trip tank 126 being connected to the mud circulation system. In an exemplary embodiment, the drilling rig 15 weighs around 1.4 million pounds. However, the drilling rig 15, while in the assembled configuration, may also only include the platform 20 being supported by the support structure 137. That is, any one or more of the choke manifold 120, the one or more shakers 125, the trip tank 126, the control system 135, the HPU 136, the top drive 70, and the drill string 80 may be removed or disconnected from the drilling rig 15, while the drilling rig 15 is in the assembled configuration.

At step 210 and as shown in FIG. 5, the rig mats 151 are positioned under the lower sub structures 140a and 140b. In an exemplary embodiment, the rig mats 151 are positioned under opposing ends 211 and 212 and under a middle portion 213 of the sub structure 140a.

At step 215 and as shown in FIG. 6, the lifts 162 are retracted so that the lower sub structures 140a and 140b are supported by the rig mats 151. In an exemplary embodiment, the lower sub structures 140a and 140b are located above the ground creating a clearance between the lower sub structures 140a and 140b and the ground or the supportive surface.

At step 220, the lifts 162 are retracted to raise the skids 170 from the ground. As the lifts 162 are connected to the lower sub structures 140a and 140b, the tracks 168 and the skids 170 can be lifted from the ground when the lifts 162 are retracted.

At step 225, the skid mats 171 are positioned under each of the skids 170.

At step 230 and as show in FIG. 7, the lifts 162 are extended so that the skids 170 are supported by the skid mats 171. Upon extension of the lifts 162, the skids 170 contact the skid mats 171.

At step 235, the lifts 162 are extended to raise the lower subs 140a and 140b and the drilling rig 15 from the rig mats 151. The step 235 is substantially identical to the step 205 but instead of lifting the lower boxes 140a and 140b from the ground, the lower boxes 140a and 140b are lifted from the rig mats 151.

At step 240, additional rig mats 151 are positioned under the lower sub structures 140a and 140b. The step 240 is substantially identical to the step 210. In an exemplary embodiment, the clearance at the step 240 is greater than the clearance at the step 215.

At step 245 and as shown in FIG. 8, the lifts 162 are retracted so that the lower sub structures 140a and 140b are supported by the additional rig mats 151. The step 245 is substantially identical to the step 215.

At step 250 and as shown in FIG. 9, the lifts 162 are retracted to raise the skids 170 from the skid mats 171. In an exemplary embodiment, the step 250 is substantially identical to the step 220 but instead of lifting the skids 170 from the ground, the skids 170 are lifted from the skid mats 171.

At step 255, additional skid mats 171 are positioned under the skids 170. In an exemplary embodiment, the step 255 is substantially identical to the step 225.

At step 260 and as shown in FIG. 10, the lifts 162 are extended so that the skids 170 are supported by the additional skid mats 171. In an exemplary embodiment, the step 260 is substantially identical to the step 230.

At step 265, the lifts 162 are extended to raise the lower subs 140a and 140b and the drilling rig 15 from the additional rig mats 151. In an exemplary embodiment, the step 265 is substantially identical to the step 235.

At step 270, additional rig mats 151 are positioned under the lower sub structures 140a and 140b. In an exemplary embodiment, the step 270 is substantially identical to the step 240.

Figure 11:
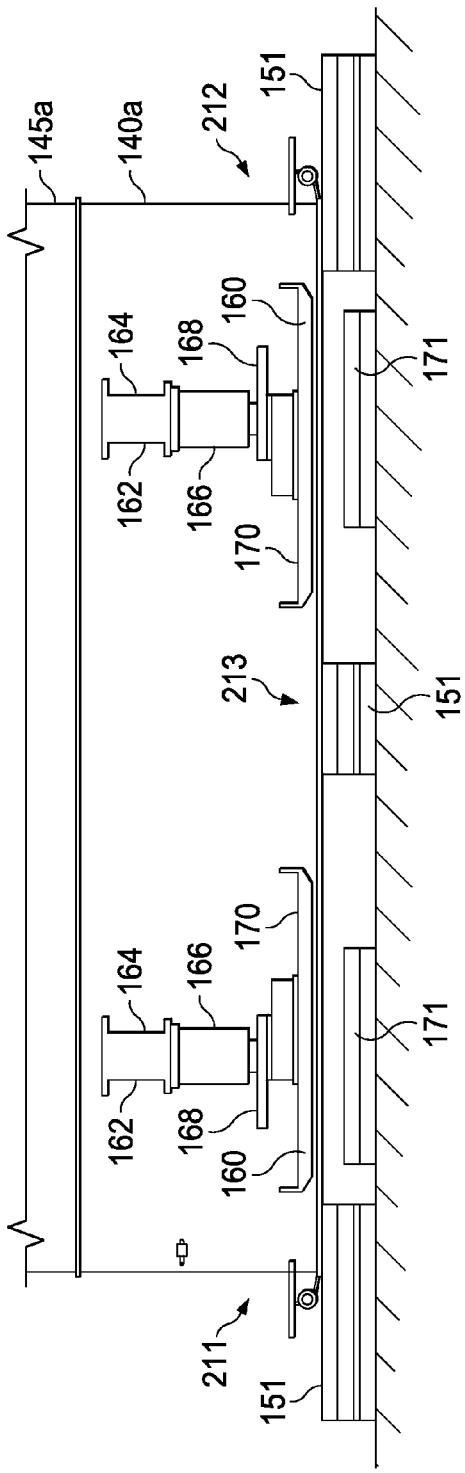
FIG. 11 is a side view of an apparatus according to one or more aspects of the present disclosure.

At step 275 and as shown in FIG. 11, the lifts 162 are retracted so that the lower sub structures 140a and 140b are supported by the additional rig mats 151. In an exemplary embodiment, the step 275 is substantially identical to the step 245. In an exemplary embodiment, the clearance increases so that the clearance at the step 275 is greater than the clearance at the step 245.

At step 280, it is determined whether the clearance is greater than a minimum height of the trailers 152. If the clearance is not greater than the minimum height of the trailers 152, then the next step is the step 250 and the process continues to increase the clearance. If the clearance is greater than the minimum height of the trailers 152 (shown in FIGS. 16-18), then the next step is step 285. In an exemplary embodiment, the minimum height of the trailers 152 is less than four feet, although other heights are contemplated.

Figure 12:
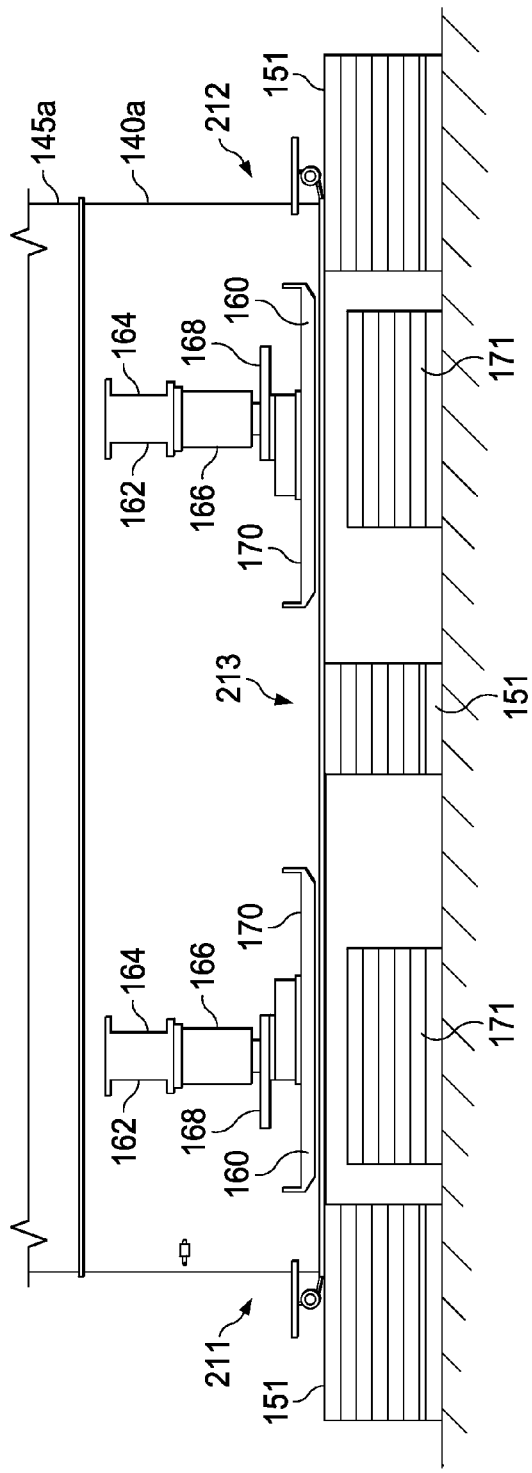
FIG. 12 is a side view of an apparatus according to one or more aspects of the present disclosure.

At the step 285 and as shown in FIG. 12, the lifts 162 are retracted to raise the skids 170 from the skid mats 171. In an exemplary embodiment, the step 285 is substantially identical to the step 250. As illustrated in FIG. 13, the rig mats 151 are located below each of the lower sub structures 140a and 140b and the skid mats 171 are located under each of the feet 160. Additionally, two of the feet 160 are located within the lower box sub 140a and two of the feet 160 are located within the lower box sub 140b. As illustrated in FIG. 14, the lower sub structures 140a and 140b, the middle sub structures 145a and 145b, and the upper sub structures 150a and 150b are supported on the rig mats 151 while lifts 162 are retracted to raise the skids 170 from the skid mats 171.

Figure 15:
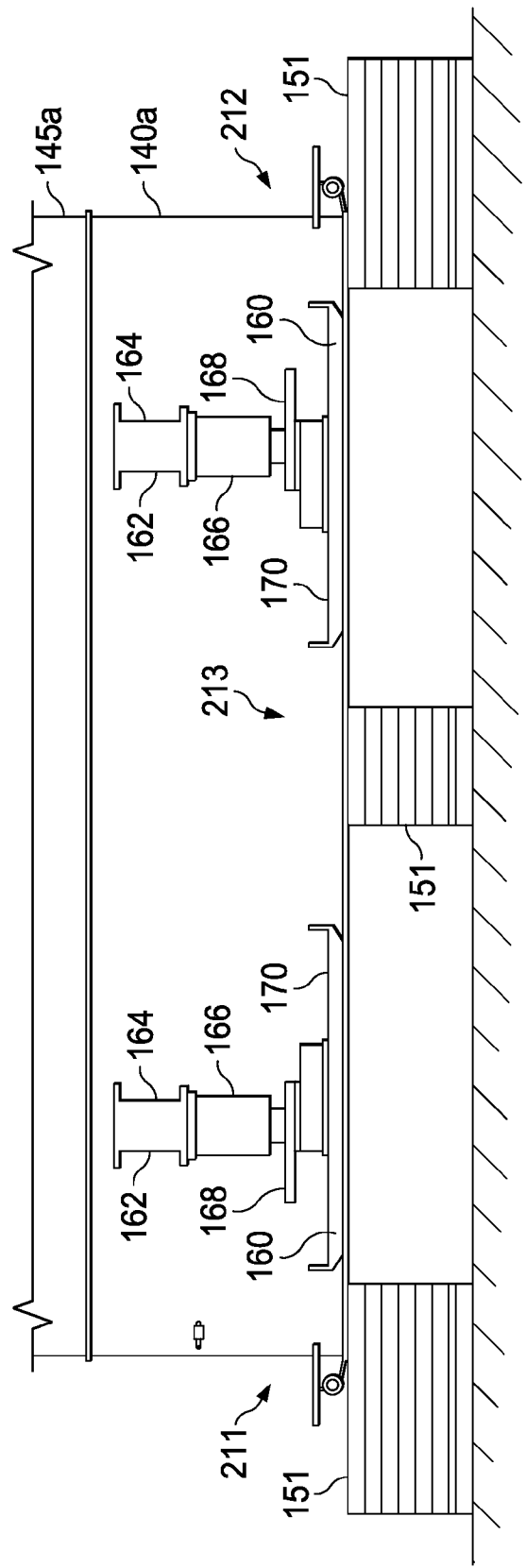
FIG. 15 is a side view of an apparatus according to one or more aspects of the present disclosure.

At step 290 and as shown in FIG. 15, the skid mats 171 are removed from below the lifts 162.

Figure 16:
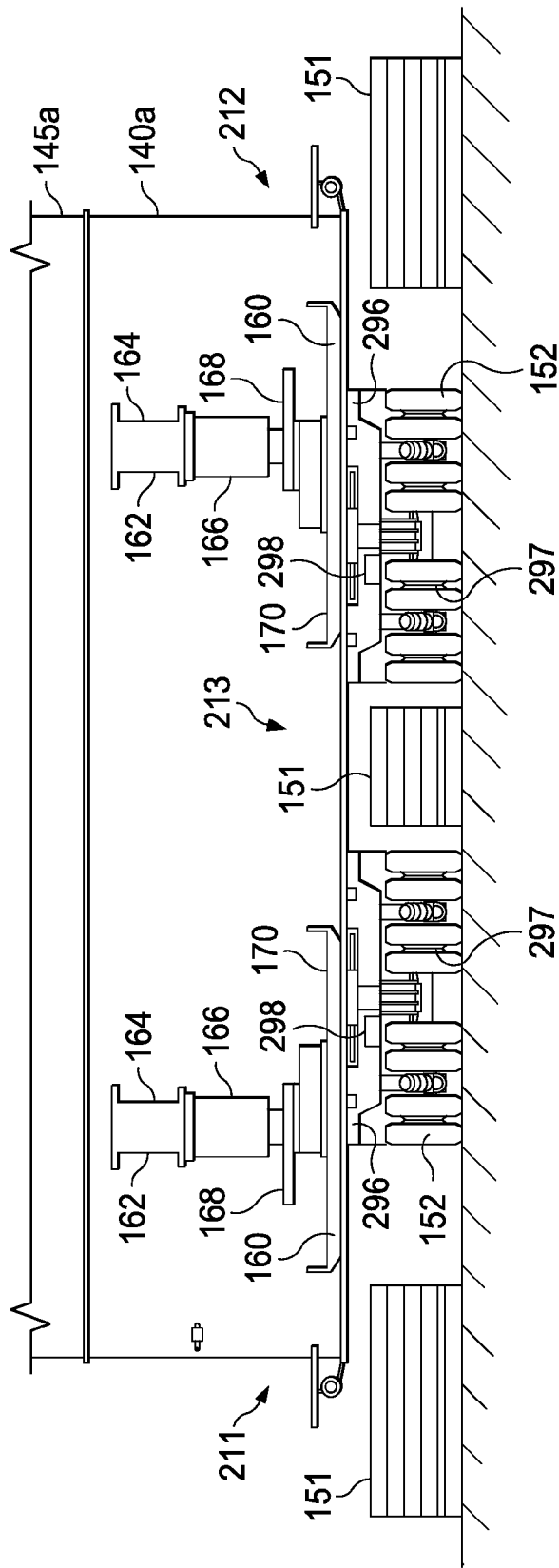
FIG. 16 is a side view of an apparatus according to one or more aspects of the present disclosure.

At step 295, the trailers 152 are positioned below the lower sub structures 140a and 140b. This is shown in FIG. 16. In an exemplary embodiment, the trailers are positioned in a parallel configuration. In an exemplary embodiment, the trailers 152 are self-propelled and are located below the lower sub structures 140a and 140b. In an exemplary embodiment, each of the trailers 152 are located below one or more of the feet 160. In an exemplary embodiment, each of the trailers 152 is a self-propelled modular transporter having a platform 296 attached to a plurality of wheels 297. In an exemplary embodiment, a tire is associated with each wheel within the plurality of wheels 297. In another exemplary embodiment, a continuous track or tank tread surrounds one or more wheels from the plurality of wheels 297. In an exemplary embodiment, the plurality of wheels 297 (whether associated with tires or a continuous track) are rolled across the ground to move the trailer 152. In an exemplary embodiment, each of the trailers 152 includes 24 lines of wheels. In an exemplary embodiment, each of the trailers 152 has a controller 298 in communication with each wheel in the plurality of wheels 297. In an exemplary embodiment, each wheel in the plurality of wheels 297 is controlled individually by the controller 298 to swivel, rotate, brake, move sideways, or spin in place. In an exemplary embodiment, the platforms 296 can move vertically relative to the plurality of wheels 297 to change the minimum height of the trailers 152. That is, the platform 296 can be lowered relative to the plurality of wheels 297 so that the minimum height of the trailer 152 is less than four feet. The platform 296 can also be raised relative to the plurality of wheels 297 so that the minimum height of the trailer 152 is greater than four feet. Other heights are also contemplated. In an exemplary embodiment, the trailers 152 are manufactured by Omega Morgan.

Figure 17:
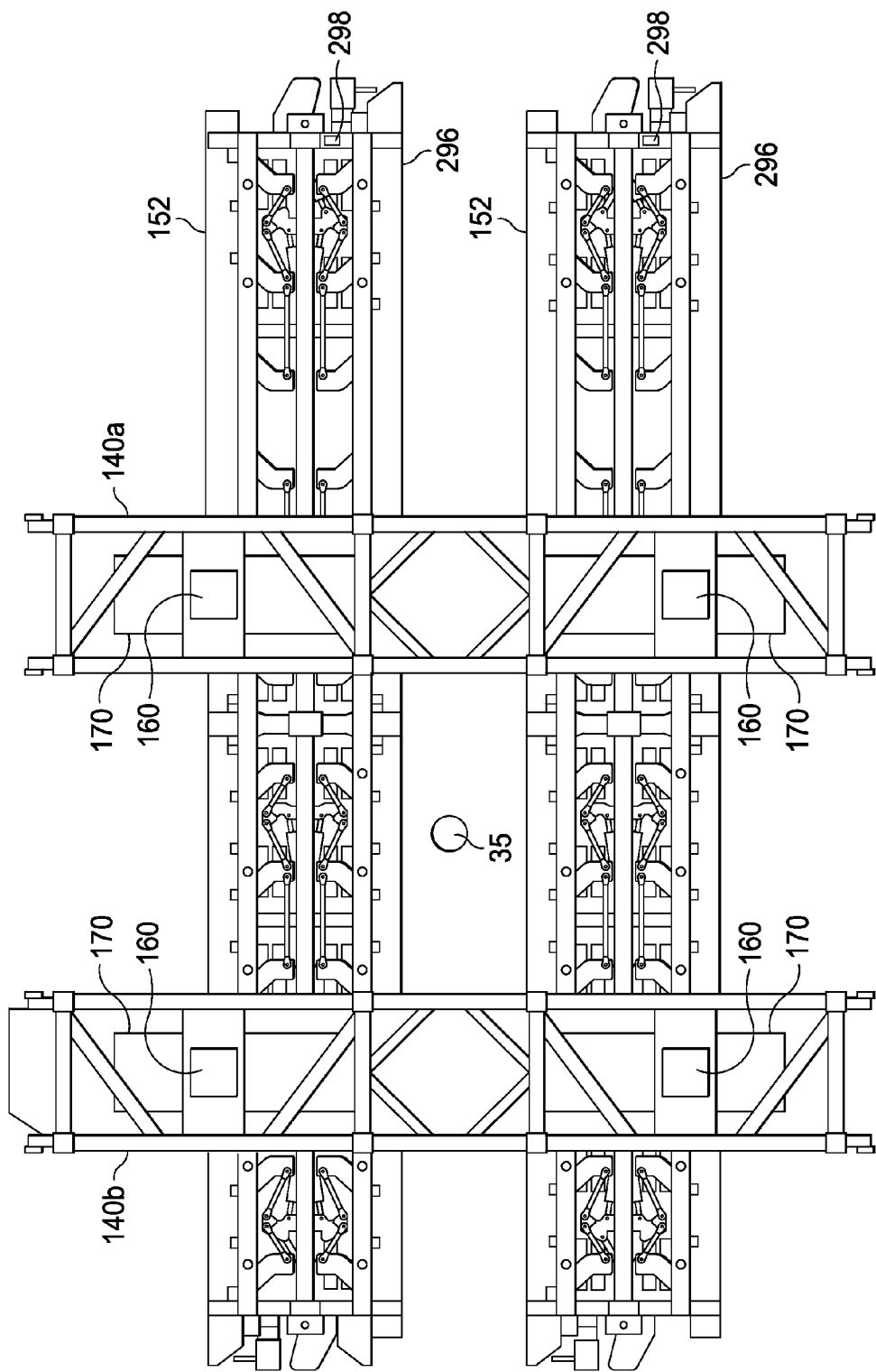
FIG. 17 is a plan view of an apparatus according to one or more aspects of the present disclosure.
Figure 18:
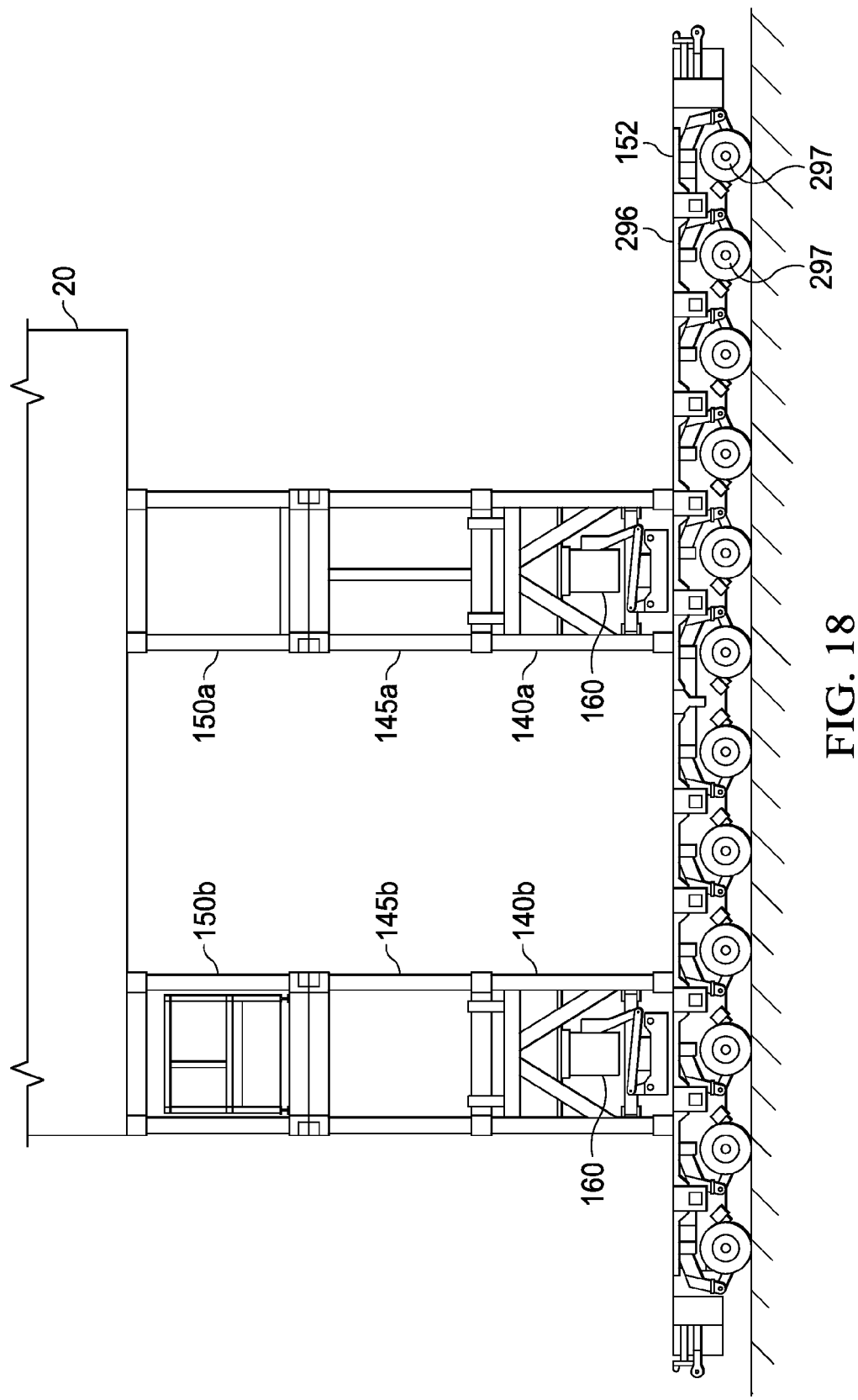
FIG. 18 is a side view of an apparatus according to one or more aspects of the present disclosure.

At step 300 and as shown in FIGS. 16-18, the platforms 296 are raised relative to the trailers 152, so that the lower sub structures 140a and 140b and the drilling rig 15 are supported by the trailers 152. However, in one exemplary embodiment, the lower sub structures 140a and 140b (and the drilling rig 15) are lowered onto the trailers 152 by retracting the lifts 162. In an exemplary embodiment, each of the trailers 152 supports both the lower sub structures 140*a* and 140*b*. The drilling rig 15 is secured to each of the platforms 296 using rigging, such as, for example, straps, cables, chains, turn buckles and shear clips (not shown).

At step 305, the drilling rig 15 is relocated or moved to a second drill site using the trailers 152. In an exemplary embodiment, the trailers 152, which are supporting the drilling rig 15, are self-propelled to move the drilling rig 15 from the first drill site to the second drill site. The drilling rig 15 is relocated from the first drill site to the second drill site by rolling the plurality of wheels 297 across the ground. In an exemplary embodiment, the first drill site and the second drill site are located over one hundred feet apart. In an exemplary embodiment, the first and second drill site are located over two hundred feet apart. In an exemplary embodiment, the first and second drill site can be spaced apart by a variety of minimum distances, such as for example, over three hundred feet apart, over four hundred feet apart, etc. In an exemplary embodiment, the trailers 152 move the drilling rig 15 while in the assembled configuration (the assembled drilling rig 15) at a minimum speed of one-half mile per hour. In an exemplary embodiment, the trailers 152 move the drilling rig 15 while in the assembled configuration at a speed greater than sixty feet per hour. In an exemplary embodiment, the trailers 152 move the drilling rig 15 while in the assembled configuration at a minimum speed of one mile per hour. In an exemplary embodiment, the trailers 152 move the drilling rig 15 while in the assembled configuration continuously (without stopping) for one hundred feet at a minimum speed of one mile per hour. In an exemplary embodiment, the trailers 152 move the drilling rig 15 while in the assembled configuration continuously for two hundred feet at a minimum speed of one mile per hour. Other distances and other speeds are also contemplated.

After the trailers 152 are positioned so that the drilling rig 15 is located above the second drill site and after the plurality of rig mats 151 are positioned below the lower sub structures 140*a* and 140*b*, the steps 205 to 300 are performed in reverse order to unload or lower the drilling rig 15 from the trailers 152. That is, the platforms 296 of the trailers 152 are lowered so that the lower sub structures 140*a* and 140*b* are resting on the plurality of rig mats 151. The trailers 152 are removed from under the drilling rig 15 and skid mats 171 are positioned under each of the feet 160. The lifts 162 are extended to contact the skid mats 171. The lifts 162 are further extended to support and to raise the lower sub structures 140*a* and 140*b* and the drilling rig 15 from the plurality of rig mats 151. A portion, or the remainder, of the plurality of the rig mats 151 are removed from under the lower sub structures 140*a* and 140*b*. The lifts 162 are then retracted so that the lower sub structures 140*a* and 140*b* and the drilling rig 15 are lowered onto the plurality of the rig mats 151. The drilling rig 15 then rests on the plurality of rig mats 151. The lifts 162 are then retracted so that each of the skids 170 no longer contact the skid mats 171. A portion, or the remainder, of the skid mats 171 are removed from under each of the skids 170. The lifts 162 are then extended to contact the remainder of the skid mats 171 or the ground. The lifts 162 are then extended to support the drilling rig 15 while a portion, or the remainder, of the rig mats 151 are removed. This process continues until the lower sub structures 140*a* and 140*b* are either resting on the ground or on a supportive surface at the second drill site.

In an exemplary embodiment, the method 200 may be used to transport the drilling rig 15 while in the assembled configuration over long range distances (i.e., more than one hundred feet). In an exemplary embodiment, the method 200 may be used to transport or move the drilling rig 15 while in the assembled configuration continuously from one drilling site to another drill site within hours. In an exemplary embodiment, the method 200 is used to continuously (without stopping) transport the drilling rig 15 while in the assembled configuration over one hundred feet at a speed of greater than one mile per hour. In an exemplary embodiment, the speed at which the drilling rig 15 is transported while loaded on the trailers 152 is approximately 40 minutes per mile. However, other speeds and distances are also contemplated. In an exemplary embodiment, the method 200 is used to increase production association with the drilling rig 15. In an exemplary embodiment, the method 200 is used to increase utilization of the drilling rig 15.

In another exemplary embodiment, the trailers 152 are pulled trailers and are not self-propelled trailers. In an exemplary embodiment, the trailers 152 are pulled by a tractor.

The present disclosure introduces a method including providing an assembled drilling rig on a first supportive surface at a first drill site, the assembled drilling rig having a walking system associated therewith, the walking system being configured to translate and rotate relative to the assembled drilling rig to displace the assembled drilling rig; actuating the walking system to lift the assembled drilling rig to a clearance height relative to the first supportive surface; positioning a trailer under the assembled drilling rig, the trailer having a height less than the clearance height and including a trailer platform coupled to a plurality of wheels; supporting the assembled drilling rig on the trailer platform; and relocating the assembled drilling rig from the first drill site to a second drill site by rolling the wheels across the ground. In one aspect, the walking system includes: a hydraulic cylinder having a top portion coupled to the assembled drilling rig; and a bottom portion coupled to a skid that contacts the first supportive surface; wherein the hydraulic cylinder extends and retracts to effect relative movement between the assembled drilling rig and the skid; wherein actuating the walking system to lift the assembled drilling rig to the clearance height includes: extending the hydraulic cylinder to lift the assembled drilling rig, relative to the first supportive surface, to a first distance; positioning rig mats under the assembled drilling rig; retracting the hydraulic cylinder so that the assembled drilling rig is supported by the rig mats; further retracting the hydraulic cylinder to lift the skid from the first supportive surface; positioning skid mats under the skid; extending the hydraulic cylinder so that the skid lowers to rest on the skid mats; and further extending the hydraulic cylinder to lift the assembled drilling rig relative to the first supportive surface by a second distance, the second distance equaling the clearance height. In one aspect, the method also includes lowering the assembled drilling rig onto a second supportive surface at the second drill site using the walking system. In one aspect, lowering the assembled drilling rig onto the second supportive surface includes: positioning the rig mats under the assembled drilling rig; lowering the trailer platform so that the rig mats support the assembled drilling rig; removing the trailer from under the assembled drilling rig; actuating the walking system by extending the hydraulic cylinder so that the skid contacts the second supportive surface; extending the hydraulic cylinder of the walking system to raise the assembled drilling rig relative to the rig mats; removing the rig mats from under the assembled drilling rig; and retracting the hydraulic cylinder of the walking system to lower the assembled drilling rig onto the second supportive surface. In one aspect, the trailer is a self-propelled modular trailer. In one aspect, the trailer further includes a controller in communication with each of the wheels in the plurality of wheels. In one aspect, the assembled drilling rig includes: a support structure supporting a rig platform; a mast extending vertically from the rig platform, the mast supporting a crown block and a racking board; and a drilling line extending from the crown block to a traveling block. In one aspect, a plurality of pipe sections are accommodated within the racking board. In one aspect, moving the trailer and the assembled drilling rig from the first drill site to the second drill site is at a speed greater than sixty feet per hour.

The present disclosure introduces a method that includes providing an assembled drilling rig resting on a first supportive surface, the assembled drilling rig including: a support structure supporting a rig platform; and a walking system coupled to the support structure, the walking system including: a hydraulic cylinder having a top portion that is coupled to the support structure; and a skid coupled to a bottom portion of the hydraulic cylinder; wherein the walking system is configured to translate and rotate relative to the assembled drilling rig to displace the assembled drilling rig, and wherein extending and retracting the hydraulic cylinder effects relative movement between the assembled drilling rig and the skid; extending the hydraulic cylinder of the walking system to lift the assembled drilling rig from the first supportive surface; positioning mats under the assembled drilling rig to support the assembled drilling rig; retracting the hydraulic cylinder of the walking system to lower the assembled drilling rig onto the mats and to lift the skid from the first supportive surface; positioning a plurality of trailers under the assembled drilling rig, wherein each trailer includes a trailer platform that is located above a plurality of wheels; supporting the assembled drilling rig on the trailer; and moving the assembled drilling rig, using the plurality of trailers, to a second drill site. In one aspect, the assembled drilling rig further includes a mast extending vertically from the rig platform. In one aspect, each of the plurality of trailers is a self-propelled modular trailer. In one aspect, each of the plurality of trailers further includes a controller in communication with each of the wheels in the plurality of wheels. In one aspect, the mast supports a racking board and wherein the assembled drilling rig further includes a plurality of pipe sections that are accommodated within the racking board. In one aspect, moving the assembled drilling rig, using the plurality of trailers, to the second drill site is at a speed greater than sixty feet per hour.

The present disclosure introduces an apparatus that includes an assembled drilling rig including a walking system configured to translate and rotate relative to the assembled drilling rig to displace the assembled drilling rig, the walking system including: a hydraulic cylinder having a top portion coupled to the assembled drilling rig; and a bottom portion coupled to a skid that contacts a supportive surface; wherein the hydraulic cylinder extends and retracts to effect relative movement between the assembled drilling rig and the skid; and a plurality of trailers supporting the assembled drilling rig; wherein the walking system is configured to lift the assembled drilling rig to a clearance height above the supportive surface; wherein the plurality of trailers is configured to be positioned under the assembled drilling rig when the drilling rig is lifted to the clearance height; wherein the plurality of trailers is configured to support the assembled drilling rig; and wherein the assembled drilling rig and the plurality of self-propelled trailers are configured to transport the assembled drilling rig from a first drill site to a second drill site at a speed greater than sixty feet per hour. In one aspect, each of the plurality of trailers is a self-propelled modular trailer including a plurality wheels. In one aspect, each of the plurality of trailers further includes a controller in communication with each of the wheels in the plurality of wheels. In one aspect, the assembled drilling rig includes: a support structure supporting a rig platform; a mast extending vertically from the rig platform, the mast supporting a crown block and a racking board; and a drilling line extending from the crown block to a traveling block. In one aspect, a plurality of pipe sections are accommodated within the racking board. In one aspect, the assembled drilling rig further includes shakers, a trip tank, and a hydraulic power unit.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. A method, comprising:
   providing an assembled drilling rig on a first supportive surface at a first drill site, the assembled drilling rig including at least a platform with a rig floor supported by a support structure and a mast extending vertically from the platform, the assembled drilling rig having a walking system associated therewith, the walking system being configured to translate and rotate relative to the assembled drilling rig to displace the assembled drilling rig;
   actuating the walking system to lift the assembled drilling rig to a clearance height relative to the first supportive surface;
   positioning a trailer under the assembled drilling rig, the trailer having a height less than the clearance height and comprising a trailer platform coupled to a plurality of wheels;
   supporting the assembled drilling rig on the trailer platform; and
   relocating the assembled drilling rig from the first drill site to a second drill site by rolling the wheels across the ground.

2. The method of claim 1 wherein the walking system comprises:
   a hydraulic cylinder having a top portion coupled to the assembled drilling rig; and
   a bottom portion coupled to a skid that contacts the first supportive surface;
   wherein the hydraulic cylinder extends and retracts to effect relative movement between the assembled drilling rig and the skid;
   wherein actuating the walking system to lift the assembled drilling rig to the clearance height comprises:
   extending the hydraulic cylinder to lift the assembled drilling rig, relative to the first supportive surface, to a first distance;
   positioning rig mats under the assembled drilling rig;
   retracting the hydraulic cylinder so that the assembled drilling rig is supported by the rig mats;
   further retracting the hydraulic cylinder to lift the skid from the first supportive surface;
   positioning skid mats under the skid;
   extending the hydraulic cylinder so that the skid lowers to rest on the skid mats; and
   further extending the hydraulic cylinder to lift the assembled drilling rig relative to the first supportive surface by a second distance, the second distance equaling or being greater than the clearance height.

3. The method of claim 1 further comprising lowering the assembled drilling rig onto a second supportive surface at the second drill site using the walking system.

4. The method of claim 3 wherein lowering the assembled drilling rig onto the second supportive surface comprises:
   positioning the rig mats under the assembled drilling rig;
   lowering the trailer platform so that the rig mats support the assembled drilling rig;
   removing the trailer from under the assembled drilling rig;
   actuating the walking system by extending the hydraulic cylinder so that the skid contacts the second supportive surface;
   extending the hydraulic cylinder of the walking system to raise the assembled drilling rig relative to the rig mats;
   removing the rig mats from under the assembled drilling rig; and
   retracting the hydraulic cylinder of the walking system to lower the assembled drilling rig onto the second supportive surface.

5. The method of claim 1 wherein the trailer is a self-propelled modular trailer.

6. The method of claim 5 wherein the trailer further comprises a controller in communication with each of the wheels in the plurality of wheels.

7. The method of claim 5 wherein the self-propelled modular trailer drives independent of a pulling tractor.

8. The method of claim 1 wherein the assembled drilling rig comprises:
   a mast extending vertically from the rig platform, the mast supporting a crown block and a racking board; and
   a drilling line extending from the crown block to a traveling block.

9. The method of claim 8 wherein a plurality of pipe sections are accommodated within the racking board.

10. The method of claim 1 wherein moving the trailer and the assembled drilling rig from the first drill site to the second drill site is at a speed greater than sixty feet per hour.

11. The method of claim 1 wherein the assembled drilling rig comprises a racking board supported by the mast.

12. The method of claim 1, wherein the assembled drilling rig comprises a shaker supported by the rig floor.

13. The method of claim 1, wherein the assembled drilling rig comprises an HPU supported by the rig floor.

14. The method of claim 1, wherein the assembled drilling rig comprises a trip tank supported by the support structure.

15. A method, comprising:
   providing an assembled drilling rig resting on a first supportive surface, the assembled drilling rig comprising:
   a support structure supporting a rig platform including a rig floor and a mast extending vertically from the rig platform; and
   a walking system coupled to the support structure, the walking system comprising:
   a hydraulic cylinder having a top portion that is coupled to the support structure; and
   a skid coupled to a bottom portion of the hydraulic cylinder;
   wherein the walking system is configured to translate and rotate relative to the assembled drilling rig to displace the assembled drilling rig, and wherein extending and retracting the hydraulic cylinder effects relative movement between the assembled drilling rig and the skid;

extending the hydraulic cylinder of the walking system to lift the assembled drilling rig from the first supportive surface;

positioning mats under the assembled drilling rig to support the assembled drilling rig;

retracting the hydraulic cylinder of the walking system to lower the assembled drilling rig onto the mats and to lift the skid from the first supportive surface;

positioning a plurality of trailers under the assembled drilling rig, wherein each trailer comprises a trailer platform that is located above a plurality of wheels;

supporting the assembled drilling rig on the plurality of trailer platforms; and moving the assembled drilling rig, using the plurality of trailers, to a second drill site.

16. The method of claim 15 wherein the assembled drilling rig further comprises a mast extending vertically from the rig platform.

17. The method of claim 16 wherein the mast supports a racking board and wherein the assembled drilling rig further comprises a plurality of pipe sections that are accommodated within the racking board.

18. The method of claim 15 wherein each of the plurality of trailers is a self-propelled modular trailer.

19. The method of claim 18 wherein each of the plurality of trailers further comprises a controller in communication with each of the wheels in the plurality of wheels.

20. The method of claim 15 wherein moving the assembled drilling rig, using the plurality of trailers, to the second drill site is at a speed greater than sixty feet per hour.

* * * * *